April 3, 1934. R. G. DREW Re. 19,128

ADHESIVE TAPE

Original Filed May 28, 1928

Witness:
A B Davison

Inventor.
Richard Gurley Drew
By. Paul Carpenter
Atty.

Reissued Apr. 3, 1934

Re. 19,128

UNITED STATES PATENT OFFICE 19,128

ADHESIVE TAPE

Richard Gurley Drew, St. Paul, Minn., assignor, by mesne assignments, to Minnesota Mining & Manufacturing Company, St. Paul, Minn., a corporation of Delaware Original No. 1,760,820, dated May 27, 1930, Serial No. 281,104, May 28, 1928. Application for reissue April 18, 1932, Serial No. 606,061

25 Claims. (Cl. 91—68)

My invention relates in general to adhesives, adhesive compositions or adhesive sheets or coatings; more particularly to pressure energizable adhesives, adhesive sheets or coatings, preferably water insoluble and normally non-drying.

My invention is a continuation-in-part of my prior application, S. N. 182,893, filed April 11, 1927, for Adhesives in the form of sheets or the like and method of making the same.

While my invention has a broad field of usefulness, I have found it of peculiar utility for producing an adhesive coating for limiting the application of the spray of liquid finishing material, such as, for example, lacquers or painting materials used in operations in automobile body paint shops and therefore find it convenient to describe the invention in connection with such practice and product, it being understood, however, that such fields of specific description are employed purely for purposes of illustration of an example of the utility of this invention in its several phases, besides other novel phases as may appear or be hereinafter pointed out.

In the work referred to specifically above, my improved material may be used directly as a coating or as an adhesive material for holding protective paper aprons or masks against surfaces on which it is not desired to apply a lacquer, paint, paint spray or lacquer spray, such as, for example, glass windows, upholstery, rubber mats, running boards, bright metal parts and wrapping material in general, and the like.

My product may also be applied to a surface which, in a subsequent step, is to be finished by an application of a lacquer spray or painting or to a surface which has been finished in order to prevent mingling of the colors, as for example, in two color work. My improved material may be applied to paper or similar fabric material in sheeted form and is capable of being stored in piled sheets or in laminations, as formed by rolling layers of material, such as tape, or such other form as may be proper for the purpose contemplated.

For certain preferred work, for advantages hereinafter pointed out, my improved material may be applied to paper to impart minimum point contact and inherent elasticity by applying the same to paper which is toweled or crimped or otherwise shaped to present a surface other than flat and which has an extensibility beyond that of the flat paper web. Further, my improved material may be applied to completely or partially cover a backing material such as paper, to present a surface which has minimum adhering surface, yet satisfies the requirements of a completely coated backing material.

It is to be observed that in finishing automobile bodies with lacquers, paints or the like of a plurality of colors, difficulty is found in limiting the application owing to the diffusion of the spray, where such is used, or requiring skillful application of the paint brush, when the latter is used. In order to obtain a clear and cleancut line of demarcation between several colors or within limited areas or applying a coating material within limited areas, masks or aprons in the form of adhesive tape have been used. These are of the general types comprising an insoluble zinc oxide adhesive coating and the rubber base adhesive coating as one group, both of which use a cloth backing, and the ordinary gummed paper tape, which forms an example of the other type. Both types of tape referred to present certain marked objections. As to the latter type, ordinary gum base tape is energized by wetting, objectionable in that it requires this wetting operation before application and still more objectionable in that it adheres so tenaciously that to remove the same requires softening of the adhesive material with large quantities of water for a long time and where this practice is resorted to the paper material becomes so weak as to laminate and tear and, to effect removal, sometimes necessitating scraping, tending to mar the underlying surface.

In the case of cloth backing, adhesive coated material, a rather expensive item is involved in the use of the cloth backing but this material is still further objectionable for use for the purpose contemplated in that the woven fabric is distensible to an extent which will make its edges irregular and unsuitable for stripping. Furthermore, the cloth is permeable to the solvents normally used in connection with lacquer whereby the adhesive coating will be disengaged and be left as a residue upon the body of the material.

Still further, a woven fabric, such as cloth, tends to unravel or leave a feathered edge and is, furthermore, of such thickness as to present a blurred effect at marginal edges of the paint or lacquer coating.

Still further, adhesive coatings, such as cloth back zinc oxide or rubber base type tapes are not only permeable to the solvents used in lacquering or painting operations tending to disengage the adhesive and leave the same upon the work but when stacked in rolls or sheets, they are more permeable to atmospheric oxidation, tending to cause an unduly rapid deterioration of the adhesive material with a consequent loss of their power of adhering to the object to which they are intended to be combined.

While for simplicity in describing the invention and as an example for makng the same, I have refered to a rubber base adhesive, it is understood that it is contemplated to employ a non-drying, pressure aggressive adhesive material and that this expression is used in the specification and claims in its broadest sense.

Among the objects of my invention are the provision of an adhesive or coating material which is non-drying or becomes aggressive by the application of pressure; the provision of an adhesive coating or coating material which becomes energizable by the application of pressure and without modification of the same by solvents or heat; the provision of an adhesive or coating material upon an inexpensive base, such as sheeted material of paper, the same being non-drying and energizable by the application of pressure without the use of solvents or heat; the provision of an adhesive upon a base of relatively non-distensible material such as paper, which may be applied to a lacquered, painted or varnished surface merely by the application of pressure of this member thereto and will present a straight edge; furthermore, the provision of an adhesive upon a base or backing, the backing serving as an impermeable member to the solvents of such materials as paints or varnishes whereby an adhesive material applied to such work as the body of an automobile will not have the adhesive coating thereof disengaged by the solvents of the lacquer, paint or varnish applied thereover; the provision of an adhesive coating material upon a base or backing, such as paper, which may be applied merely by the application of pressure and which may be retained in superimposed layers thereof, such as stacks or piles or rolls without the use of slip sheeting whereby the back of the sheeting may be removed from the adherent coat of an adjacent layer; the provision of a sheeted material having an adhesive coating, which is normally non-drying and pressure aggressive but which is so formed as to contact with work upon which it is applied to have sufficient adhesiveness for its intended function of holding a sheeted material in position but without marring the work to which it is applied, characterized by coating a base or backing of paper which is creped, toweled or otherwise formed to lessen contact over its entire area; the provision of a sheeted material having an adhesive coating thereon to limit the contact of the adhesive coating as by forming the paper by crepeing or toweling or localized application of the adhesive coating to the surface of the sheeted material; the provision of a sheeted material having a pressure aggressive adhesive material which may be adhesively applied to a surface and separated therefrom without splitting of the paper or marring of the body to which it is applied or leaving a residuum of the adhesive particularly after use in a painting operation by application of solvents for the paint to the back side of the same.

A still further object of my invention resides in the provision of a sheeted material having a pressure aggressive coating thereon, the whole of which is relatively somewhat stretchable and somewhat resilient, characterized by forming the backing from creped or toweled paper; the provision of a sheeted material having a paper or like base treated to render the same impermeable to coating materials, such as lacquers, paints, varnishes or the like whereby solvents used in lacquers, paints, varnishes or the like will not disengage the adhesive material which may be mounted thereon; the provision of a sheeted adhesive material having a paper base treated whereby a pressure aggressive adhesive may be applied thereto without permeating to the other side thereof; the provision of a sheeted adhesive material having a calendered, or a bibulous uncalendered paper base saturated with an adhesive material whereby an adhesive coating may be applied to the same for adhesively attaching the same to a surface by the application of pressure and capable of being separated from such surface without tearing or splitting of the paper or leaving a residuum of the adhesive material upon the surface to which it is applied.

My invention still further has for an object thereof the provision of a sheeted material having a base such as paper, including on one surface thereof a non-drying adhesive coating comprising rubber and a resinous material, the adhesive being energizable by the application of pressure and which is capable of retaining the adhesive character under the most adverse atmospheric conditions, the sheet being characterized by freedom from loss of adhesiveness and material change of the rubber and which may be further stacked or piled without the use of slip sheeting characterized by the absence of permeation of the adhesive coating to the back surface of the sheet.

The invention still further has for an object thereof the provision of an adhesive tape material having a paper base in which the filamentary material of the paper is locked and is resistant to tearing and splitting when in contact with an adhesive surface; the provision of adhesive tape material having a paper base in which the filamentary material of the paper is locked and is resistant to tearing and splitting when in contact with an adhesive surface characterized by surface treating and saturating the paper with a glue or gelatin base material; the provision of a sheeted adhesive material having a paper base which is resistant to tearing and shock by forming the same from creped or toweled paper and surface treating or saturating the same with a glue or gelatin base material whereby a pressure aggressive water insoluble adhesive coating may be applied thereto; the provision of a sheeted material having a paper base, treated or saturated with a glue or gelatin base material and further surface treated with separator material for an insoluble pressure aggressive coating whereby sheets may be rolled or stacked without the use of intermediate slip sheeting; the provision of a sheeted material having a paper base, surface treated or saturated with a glue or gelatin base composition and a flexibility augmenting agent including glycerine whereby the surface thereof may be substantially non-adherent to a non-drying, pressure aggressive adhesive material, such as zinc oxide or rubber base adhesives, to provide a material capable of being stacked, piled or rolled without the use of intermediate slip sheeting; the provision of a sheeted material having a paper base, having an adhesive applied to limited portions thereof, such as predetermined edges of one surface whereby limited adhesiveness may be had with covering capacity of the entire sheet.

To attain these objects and such further objects as may appear herein or be hereinafter pointed out, I make reference to the accompanying drawing forming a part hereof, in which—

Figure 1:
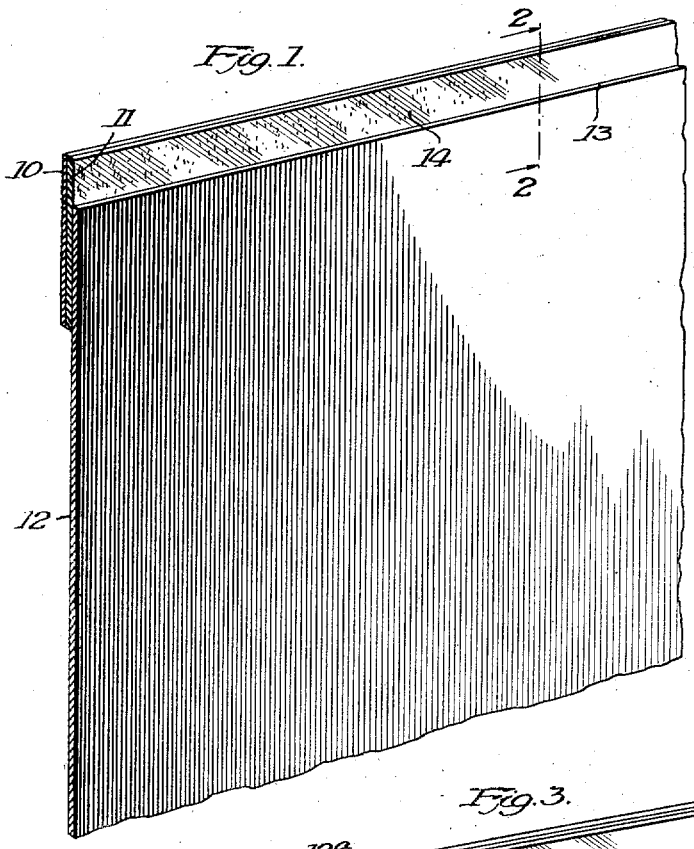
Figure 1 is a perspective view illustrating my invention as applied for use in connection with a painter's mask.
Figure 2:
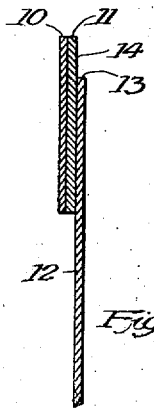
Figure 2 is a section taken on the line 2—2 of Figure 1.

One embodiment of my invention is in the form of a sheeted material in the nature of a tape 10, of a paper base of the character hereinafter referred to and described and treated in accordance with an invention disclosed in my application S. N. 182,893, filed April 11, 1927, and is preferably a paper saturated with a glue or gelatin base and is coated on one face with a non-drying, pressure aggressive adhesive 11. In this form, to apply a mask or apron 12 for painting or lacquering operations, a sheeted material which may be paper or the like has attached thereto adjacent the edges 13 a strip of tape 10 and it is positioned so that a portion 14 projects beyond the edges 13. The projecting portion 14 may thereafter be applied to fasten the mask or apron wherever desired, duplicating the affixation of the attaching strip at opposite edges of this mask, it being understood, however, that the strip itself may be used to cover surfaces of its own width.

Figure 3:
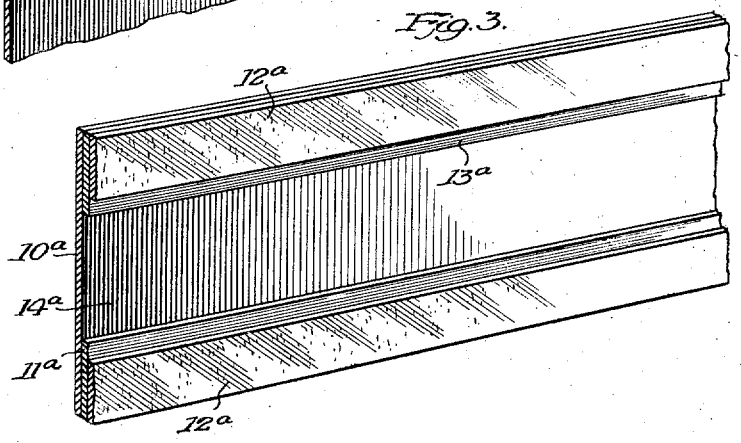
Figure 3 is a perspective view of another embodiment of my invention.

In Figure 3 I have illustrated another embodiment of my invention comprising an adhesive sheeted material in the nature of the tape 10*a* of a paper base of the character hereinafter described or treated in accordance with the process outlined in my application aforementioned. One face 11*a* has thereon edge strips of adhesive material 12*a*, preferably mounted upon an interposed priming coat layer 13*a*, thus forming spaced adhesive portions and intermediate, non-adhesive portion 14*a*, thereby providing a tape or sheet of limited adhesive contacting surface, though of covering capacity equivalent to the full width of the tape or sheet.

The paper base 10 may be any of the following, which I cite by way of example:

(*a*) Craft paper, regular sulfate paper, straight 100% wood pulp;

(*b*) Sulfite paper containing a goodly portion of cotton stock, suitably sized and maintained soft by additions of small quantities of glycerine;

(*c*) A parchmentized paper;

(*d*) A paper base which is preferably absorbent, approaching blotting paper, calendered or uncalendered; preferably, however, this paper base is of the unsized, uncalendered variety and is pressed, molded or otherwise formed with rugosities or corrugations to have the appearance of toweled fabric, such as by crimping or crepeing the same.

Paper of the character above described may have directly applied to one surface thereof a water insoluble, non-drying adhesive, preferably energizable or active merely by the application of pressure, so-called a zinc oxide or rubber base adhesive for surgeon's or industrial tape. This adhesive material may be given as follows:

*Example A*

A rubber compound and tackiness augmenting agent in the form of a synthetic resin. Proportions suitable for ordinary temperate climates may comprise:—

10 lbs. of plasticized, first quality plantation rubber, such as clear crepe or smoked sheets, 2 lbs. of cumaron gum or resin, ½ lb. of zinc oxide pigment.

The cumaron gum or resin is preferably an artificial resinous material coming under the group name of cumaron and indene resins, which is the polymerization product of coal tar derivatives. The above ingredients are compounded on a rubber rolling mill to a plastic condition and then cut to desired body or consistency, using a rubber solvent such as benzol or a petroleum solvent, such as high test gasoline.

In lieu of a synthetic resin I may employ a low boiling point natural resin, e. g., Burgundy pitch or pine oil foots. Burgundy pitch is soluble in both alcohol and benzol.

*Example B*

2 lbs. of plantation rubber 5 lbs. of Mexican or wild rubber, high in natural resin content 1 lb. of zinc oxide pigment.

The ingredients above enumerated are compounded on a rubber mixing roll and then cut to the desired consistency in a rubber solvent, based upon the necessary viscosity for spreading this material. Ordinarily, in both Examples A and B, the solvent is calculated by the number of pounds of solid compound in one gallon of solvent, such as, for instance, 8 lbs. of solid or compounded material and 1 gallon of benzol, which is commonly referred to as an 8 pound cut. The variations in proportions of solvent added will depend upon the desired thickness of the adhesive coating required in the residuum.

It will be understood that the examples above given are for purposes of getting the requisite adhesiveness in temperate climates. An increase in resinous material or wild rubber may be made for material to be used in colder climates and in warmer climates the resin component may be reduced.

The resinous component may also be varied in its characteristics in its reactions to solvents by choice of the resinous material. Thus, for purposes of removal of the adhesive from some body to which it may be applied, it may be made soluble to various organic solvents, either benzol, gasoline, acetone or alcohol. Thus, where it is desirable to make a surgeon's tape, which is soluble in alcohol, an alcohol soluble resin is added in the examples above cited. Such resin may be Burgundy pitch. This will permit alcohol to be used in removing a piece of adhesive tape from any surface, such as from the skin of a patient, by merely soaking the backing of the tape in alcohol. The rubber, in any event, merely acts as a vehicle for the resin and the character of the adhesive in its reaction to solvents will be dependent upon the character of the resin incorporated with the rubber.

The rubber resin compounds in their solvents may be spread upon the paper backing directly, utilizing a knife spreader to uniformly and equally distribute this material upon the base or backing. The solvent may thereafter be removed by evaporation, preferably without recovering the solvent and leaving the rubber mixture upon the paper backing.

Though I may directly apply the rubber in its solvent upon a paper backing, particularly of the character above indicated as craft or white paper, it is preferred to preliminarily treat the paper with sizing coats, priming coats or separator coats.

Though, as above described, I may use the craft paper, white paper or parchmentized paper directly for a base or backing for the rubber adhesive, it is preferred to treat one side of the paper with a rubber primer and the opposite side of the paper with a rubber finisher and then applying the rubber adhesive to the side of the paper first treated with the ruber primer, after first preferably treating the paper, especially where that hereinabove examplified as A, B or the suggested modifications thereof is used, with a glue-glycerine solution insolublized and preferably flexiblized by the process herein described and more particularly referred to in my application, S. N. 182,893.

The rubber primer is preferably a very light solution of rubber, which will leave a very thin residue of rubber, preferably tacky and to render the adhesive coating more amenable to adhesion therewith. The rubber finisher is preferably a solution of rubber which will leave a modified rubber deposit, such as chlorinated rubber or vulcanized rubber, thus leaving a residuum of rubber which is non-tacky and non-adherent to the touch of the hand or when stacked or rolled, will be capable of ready separation from the adhesive face. Tape so made can be wound up in rolls without slip sheeting and unwound successfully.

An example of a rubber primer as above used is as follows:

100 parts by weight of milled plantation rubber,

7½ parts by weight of phenolsulphonic acid.

This combination is formed in sheets and subjected to an oven temperature of 135 to 140 degrees centigrade for approximately six hours. The resulting product is flexible, and when dissolved in benzol forms an extremely liquid solution.

Untreated, smoked sheets, when cut in benzol, will form a very heavy, viscous and gelatinous solution.

Conversion of rubber into thermoplastic products, can also be accomplished by using other reagents, such as toluensulphonyl chloride and toluenesulphonic acid.

An example of a rubber finisher as above referred to may be made as follows:

Plantation rubber dissolved in a suitable solvent, such as benzol, is placed in an agitator into which a small stream of chlorine gas is allowed to flow. The temperature is checked by artificial refrigeration, and the chlorine treatment continued until the rubber solution has become about 55% chlorine saturated. Beyond this point free chlorine escapes, which is not desirable.

It will be understood that I may, for certain purposes, substitute for the rubber finisher coat a treatment such as outlined in my application S. N. 182,893 and the means therein described for assuring separation between the back of one sheet and the adhesive surface on the opposite side of an adjacent layer.

In the practice of my invention utilizing parchmentized paper, the adhesive base may be applied directly thereto. It is preferred to treat the back with glycerine or a glue-glycerine mixture and the opposite side, before applying the rubber adhesive, with a rubber priming coat—still further, by substituting for the glue-glycerine back size a rubber finisher coat as in the example above described. The back of the parchmentized paper, whether including a back size or rubber finisher coat, or not, may be improved during its manufacture or subsequently, by the addition thereto of a thin coating of glycerine.

Unsized craft paper or the creped, toweled paper above referred to may be used directly for applying thereto the rubber adhesive, preferably first interposing the finishing coat on the back and the priming coat on the front before applying this adhesive coating. Preferably, where the paper is of the unsized, uncalendered variety, the fibres thereof may be strengthened by treatment with a glue-glycerine solution to completely bond the fibres and may be insolubilized or tanned and have the flexibility thereof augmented by the process described in my application S. N. 182,893. Paper so treated, particularly as a result of first saturating with glue-glycerine and treatment with formaldehyde, forms a splendid base for the rubber primer, it being understood that I may treat the paper with glycerine or glue-glycerine after first applying a rubber priming coat, in which case it forms a layer to seal the surface of the paper, preventing the glycerine or glue-glycerine from penetrating into the rubber primer, and thus weakening the adhesiveness of the rubber. The fibrous material of the paper is bonded against lamination and is highly flexible. Economy is also effected in the amount of glue and glycerine necessary for saturating the paper base. I find that where the back of the paper is so treated, the primer adheres more firmly thereto.

A paper base of the character above described may be treated with a glue base saturating solution or an insoluble solution. For this purpose, the paper base is first sized with a solution of a polyhydric resin, a synthetic resinous material resulting from the reaction, condensation or polymerization of polyhydric alcohols or their anhydrides or similar compounds or polyhydric acids or their anhydrides. This center sizing material for the paper base may have its flexibility suitably augmented and upon evaporation of the vehicle there may be applied the rubber adhesive layer, preferably by first treating one side with a rubber primer and back size with a rubber finisher of the character hereinabove referred to.

For making a paper base or backing, the paper is first submitted to a preliminary treatment by a saturating solution involving a glue base. The saturating solution of the following materials in proportions represent my preferred practice:—

36 pounds of dry glue
72 pounds of water 108 pounds (approx. 16° Twaddell) glue solution.

Complete swelling is permitted, assisted by warming.

To this is then added 108 pounds of yellow glycerine.

108 pounds (approx. 16° Twaddell) glue solution
108 pounds pale yellow glycerine 216 pounds glue-glycerine water solution To this is added 216 pounds of water.

216 pounds of glue-glycerine water solution
216 pounds water 432 pounds.

The paper above described is preferably continuously submerged and passed through a bath of the saturating solution as above prepared and then passed through pressure rolls to squeeze off the excess and then dried by heating. It will be observed that just complete saturation is preferred as this step is closely related to the success or failure of the treatment. An insufficient saturation will be characterized by failure to completely bond the fibres of the unsized paper nor will the saturating solution be present on the back side. An oversufficient saturation of the paper will render the surface unfit for subsequent coating, which will be observed as this description proceeds.

A paper so treated will be found to have the fibres thereof locked to materially strengthen the paper web and provide a highly flexible sheet. Where I use the toweled or creped variety of paper, this sheet will be found to be substantially elastic and resistant to tearing by shock, as where using the same for wrapping purposes.

Prior to the drying step above mentioned, in one form of the practice of my invention, after the paper has been saturated and passed through the pressure rolls, the web of material is subjected to a treatment tending to insolubilize or tan the glue. The insolubilizing or tanning agents may be formaldehyde in solution or as a vapor, sodium carbonate solution of gallic and tannic acids, chromium trioxide and chrome alum or other chrome and aluminum salts.

My preferred practice is to submerge the paper in a bath consisting of one part commercial formaldehyde and nine parts water by volume. The lapse of time between saturating with glue-glycerine water solution and formaldehyde does not seem to materially affect the quality of the paper. Formaldehyding on one side only, that is, the application of formaldehyde to one face of the previously treated paper, is preferred for purposes which will hereinafter appear where it is desired to further coat the untreated surface and leave the opposite surface substantially inactive.

The formaldehyding on one face only has the advantage that immediate insolubilizing or tanning may be practiced and further, treating one side only is less strain on a paper than complete submersion, particularly where the formaldehyde is in the form of a solution and the saturated paper before the excess water is evaporated is of low tensile strength and therefore more subject to tear or break. The treated surface is then submitted to a neutralizing action and where formaldehyde is used for the insolubilizing or tanning action, I may accomplish neutralization by subjecting the paper to a lime water treatment. It is preferred, however, to submit the formaldehyded web to a heat treatment. A temperature of 140 to 160° F. is used to thoroughly dry and volatilize all surplus formaldehyde.

It will be observed that I have described the saturation and the insolubilizing or tanning of the glue base as separate steps. However, the tanning or insolubilizing agent may be incorporated in the saturating solution above described, the tanning action or insolubilizing action of the glue being accomplished simultaneously with the drying of the saturating solution. For this purpose there is added to the saturating solution the tanning or insolubilizing agent. Where I use formaldehyde, I put an aldehyde compound into the glue solution prior to the saturation step. It is preferred to retard the action of the aldehyde so that the insolubilizing or tanning of the glue is accomplished in the drying step. This retarding activity is accomplished by taking any aldehyde compound, such as formaldehyde, and adding ammonia thereto. In practice, equal molecular percentages of formaldehyde and ammonia are used in amounts equivalent to 5% of the aldehyde to the dry weight of the glue.

The saturating solution thus modified is used in the manner previously described. In the drying of the paper, the aldehyde-ammonia compound breaks down to liberate formaldehyde, setting up, insolubilizing or tanning the glue.

Though mere exposure by air drying of the saturated paper will sufficiently insolubilize the glue, due to the decomposition of the ammonia-formaldehyde compound, to liberate formaldehyde, however, it is preferred to hasten this decomposition by heating the saturated web. Ordinarily a temperature of approximately 80° C. will be sufficiently rapid. However, it is preferred to use a temperature between 100 to 120° C., which has been found to sufficiently set the glue with a speed of operation conducive to best practice.

The sheet so saturated and heat treated will have the glue or gelatine base substantially insoluble and, in a sense, waterproof. The paper base will be particularly strengthened and be resistant to sudden shock or stress, making it admirably suited for wrapping purposes. Particularly desirable elastic properties will be obtained where the paper base is of the toweled or creped variety wherein actual elasticity is imparted to the paper in that it retains the crimping or crepeing originally formed or molded in the paper and the tensile strength is materially increased and is tougher in a wet state when carrying its minimum amount of water content, apparently due to a vulcanizing or glueing together of the fibres of the paper into a solid mass. The flexibility augmenting agent further provides a sheeted material resistant to tearing when sharply folding the same.

Where I have described the use of dry glue with pale yellow glycerine, it will be observed that good results have been obtained with cheaper material such as low grade glue and using the crude rather than the pale yellow glycerine. Other flexibility augmenting agents as a modifier for the glue in place of the glycerine may be used. For certain purposes, particularly as will hereinafter be described, sulphonated oils such as Turkey red oil, sulphonated castor oil, may be used. These materials are not hygroscopic and tend to check, to a certain extent, the tendency to absorb and carry too much water. While I may use hygroscopic agents in general, for modifying the glue to retain a certain amount of water content inducing flexibility, it is preferred to use organic modifier and for this purpose a sugar content fused in the glycerine of the saturating liquid has been found to be particularly desirable. A paper web saturated with glue, formaldehyded or tanned as above described, has been found to be waterproof and particularly suitable as a base for forming the adhesive tape previously described when there is coated thereover the pressure aggressive, non-drying rubber base adhesive previously described.

By "normally pressure sensitive adhesive" I mean to include a coating which normally is adhesive by pressure, as in applying a tape to a body material in which adhesion is effected without the necessity of energizing the adhesive by a moistening agent.

By a "unified cellulosic backing" I mean to include a web of fabric comprising paper chosen from the materials herein described including gelatinized cellulosic sheets, such as parchmentized paper, preferably treated with glycerine; paper treated with a composition consisting of glue, preferably modified by a softening agent, such as glycerine; paper surfaced with an insoluble rubber, such as chlorinated rubber; paper surfaced with an insoluble varnish compound, such as an insoluble resinous condensation product, the products whereof have the materials of the sheet in a condition so that when coated with a normally pressure sensitive adhesive, the elements of the sheet will be protected and held together against separation and with greater adhesion inter se than the adhesive coating has for the material to which the adhesive coating is affixed, to permit removal of the sheet from work to which it is applied or from rolls of stacks of such sheets, without substantial splitting or lamination of the sheet.

By a "unified pressure sensitive adhesive" I mean to include a coating which is normally adhesive by pressure as in applying a tape to a body material in which adhesion is effected without the necessity of energizing the adhesive by a moistening agent, and which has greater adhesion to the backing to which it is applied and cohesion inter se than adhesion to the surface to which it is temporarily applied, to permit its use for the purposes herein outlined, without substantial breaking, separation or lamination.

The specially treated paper and its adhesive coating duplicate results attainable heretofore only with cloth backing and, in addition, has marked advantages thereover. The paper base adhesive tape—

(1) Produces a flexible sheet with more body and density than cloth, particularly where a creped or toweled paper is used;

(2) High tensile strength is obtained by loading the paper with glue, particularly when acted upon by an insolubilizing, tanning or formaldehyding agent. This renders the glue incapable of dissolving in water, which permits it to retain a considerable amount of its strength when in contact with water and hygroscopic materials which may constitute the adhesive film. When glycerine or other modifying elements are used, the saturated sheet is particularly flexible and resistant to breaking thereof by bending;

(3) The saturating and coating accomplish an action of welding, vulcanizing or glueing together of the paper fibres into one solid sheet, which makes impossible any laminating or splitting of the tape when removed from a surface to which it has been applied for some time or when put up in rolls without the use of slip sheeting;

(4) The treatment, particularly the saturating treatment of the paper, particularly when accompanied by insolubilizing, tanning or formaldehyding, also makes impossible any surface fibres breaking away or tearing away from the backing and sticking to the adhesive film when unwound from a roll. Thus, no modification of the adhesive film is effected.

(5) The hygroscopic agent, such as glycerine, retained in the saturated paper, maintains a water content in the paper backing of which it is a part. The adhesive film is therefore prevented from anchoring itself too securely to the reverse side of the backing, that is, a non-drying adhesive secures a hold or adheres to a dry surface much more thoroughly than to one which is moist or damp. Also, as the glue saturated paper has been insolubilized, tanned or formaldehyded, the adhesive coating will not unite with the backing as there is no solution possible between the rubber base adhesive and an insolubilized gelatin.

(6) The paper affords a material cheaper than cloth, which will not stretch as cloth does and, in a painting operation, which enables the user to preserve the same for striping and the like painting or finishing operations. The paper base or backing being relatively thin, permits sharper definition in a painting operation for two tone color jobs as it lies substantially in the plane of the body to which it is affixed. Furthermore, the edge of a paper backed adhesive tape presents no feather edge nor will it unravel as cloth backing will, making it additionally desirable in painting operations.

(7) The paper backing with an adhesive layer at the edges thereof has the covering capacity of the full width of the paper but with minimum adhesion, permitting an economy in the adhesive coating, a ready removal from the body to which it is applied, avoiding the danger of marring the surface to which it is applied, may be unrolled or separated from an adjacent sheet with great facility and, in general, the paper backed adhesive tape widens the field of utility due to cheapening the cost of the entire article.

Having thus described my invention and illustrated its use, what I claim as new and desire to secure by Letters Patent, is—

1. As a new article of manufacture, a sheeted material including a creped or toweled fabric base and a pressure sensitive adhesive coating on one face thereof.

2. As a new article of manufacture, a removable adhesive tape comprising a paper backing formed with rugosities by crepeing or toweling and a pressure sensitive adhesive coating on one face thereof.

3. As a new article of manufacture, an adhesive sheet comprising a unified cellulosic backing and a pressure sensitive adhesive coating united to one surface of the backing.

4. As a new article of manufacture, an adhesive sheet comprising a unified cellulosic backing and a pressure sensitive adhesive coating united to one surface of the backing, the other surface of the backing being repellent to the adhesive.

5. As a new article of manufacture, a sheeted material including a water insoluble unified pressure sensitive adhesive united to one surface of a cellulosic backing, the opposite surface of said backing being unified by a repellent for said adhesive.

6. As a new article of manufacture, an adhesive sheet comprising bibulous paper substantially saturated and unified with a substantially solidified mass of a solution of glue-glycerine composition, and a pressure sensitive adhesive coating on one face thereof.

7. As a new article of manufacture, an adhesive sheet comprising a bibulous paper impregnated with a quantity of a substantially solidified mass of a solution of glue-glycerine in proportions of such solution to the paper, unifying the fibres of the paper and a water insoluble exposed rapidly aggressive adhesive coating united to one surface thereof.

8. As a new article of manufacture an adhesive article, a paper backing impregnated with a unifying material in proportions of such material to the paper, unifying the fibres of the paper and a water insoluble exposed rapidly aggressive adhesive surface on one face thereof.

9. As a new article of manufacture, an adhesive article, a paper backing impregnated with an unifying impregnating agent in proportions of such agent to the paper, unifying the fibres, the impregnating agent comprising a "set" glue-glycerine composition and an exposed rapidly aggressive adhesive coating united to one face thereof.

10. In an adhesive article, in combination with a paper backing impregnated with a flexibilized gelatinous unifying composition, of a pressure sensitive adhesive coating united to the backing.

11. In an adhesive article, in combination with a paper backing impregnated with a solidified flexibilized gelatinous composition, of a water insoluble, pressure sensitive adhesive coating united to the backing.

12. As a new article of manufacture, paper backing formed with rugosities by crepeing or toweling impregnated with an unifying composition and water insoluble exposed rapidly aggressive adhesive surface on one face thereof.

13. As a new article of manufacture, a paper backing impregnated with a flexibilized gelatinous composition set to an unifying consistency and formed with rugosities by crepeing or towelling and an exposed rapidly aggressive adhesive coating united to one face thereof.

14. In an adhesive article, in combination with a paper backing impregnated with a solidified flexibilized unifying composition for the fibres of the backing, of a pressure sensitive adhesive coating united to the backing on one surface thereof.

15. As a new article of manufacture, an adhesive article comprising a paper backing saturated with a unifying composition comprising a substantially solidified glue-glycerine composition and a pressure sensitive coating on one face thereof.

16. A gum treated paper comprising a base material forming the backing and treated with a gum and an adhesive coating on said base comprising a mixture of two resinous gums having dissimilar rates of solubility.

17. As a new article of manufacture. a sheeted material including toweled or creped paper impregnated with a composition comprising glue and a flexibility augmenting agent and a pressure sensitive adhesive coating on one surface thereof.

18. As a new article of manufacture, a sheeted material including a toweled or creped paper impregnated with a composition comprising glue and an organic agent adapted to augment the flexibility of the glue and a pressure sensitive adhesive coating on one surface thereof.

19. As a new article of manufacture, a sheeted material including a bibulous, uncalendered paper impregnated to bond the fibres with a composition comprising glue, glycerine and water to render the sheet flexible and a pressure sensitive adhesive coating on one surface thereof.

20. As a new article of manufacture, a sheeted material including a creped paper impregnated without excess with a composition comprising a solution of glue and glycerine to bond the fibres to prevent laminar separation and splitting, and render the paper flexible and resilient, and a pressure sensitive adhesive coating on one surface thereof.

21. As a new article of manufacture, a sheeted material including a creped paper impregnated without excess with glue and a flexibility augmenting agent therefor, said glue being insolubilized and a pressure sensitive adhesive coating on one surface thereof.

22. As a new article of manufacture, a sheeted material comprising a bibulous paper base impregnated without excess with a gelatin solution including a flexibility augmenting agent, said sheet having one face thereof rendered water resistant, and a pressure sensitive adhesive coating on one surface thereof, the adhesive layer being on the opposite face to said water resistant face.

23. As a new article of manufacture, a sheeted material comprising a bibulous paper base impregnated without excess with a gelatin solution including a flexibility augmenting agent, said sheet having one face thereof rendered water resistant by a layer of formo-gelatine, and a pressure sensitive adhesive coating on one surface thereof, the adhesive layer being on the opposite face to said water resistant face.

24. As a new article of manufacture, a sheeted material comprising a bibulous paper base impregnated without excess with a gelatine solution including a flexibility augmenting agent, said sheet having one face thereof rendered water resistant by a layer of formo-gelatine and a pressure sensitive adhesive coating attached to the sheet thus formed and positioned to be interposed between and in direct contact with layers of said paper base and water resistant face when said sheeted material is formed into rolls or stacks.

25. As a new article of manufacture, a readily removable and reusable adhesive sheet comprising bibulous paper containing rugosities substantially saturated and unified with a substantially solidified mass of a solution of distortable unifying composition, and a pressure sensitive adhesive coating on one face thereof, said rugosities serving to afford an interrupted contacting surface and thus facilitating removal of the sheet from a surface to which it may be applied.

RICHARD GURLEY DREW.